(12) United States Patent
Yamashita et al.

(10) Patent No.: US 9,991,510 B2
(45) Date of Patent: Jun. 5, 2018

(54) NEGATIVE ELECTRODE MATERIAL FOR LITHIUM ION SECONDARY BATTERY, COMPOSITE NEGATIVE ELECTRODE MATERIAL FOR LITHIUM ION SECONDARY BATTERY, RESIN COMPOSITION FOR LITHIUM ION SECONDARY BATTERY, NEGATIVE ELECTRODE FOR LITHIUM ION SECONDARY BATTERY, AND LITHIUM ION SECONDARY BATTERY

(71) Applicant: TORAY INDUSTRIES, INC., Tokyo (JP)

(72) Inventors: Tetsuo Yamashita, Otsu (JP); Natsuko Chayama, Otsu (JP); Tomoyuki Yuba, Otsu (JP); Eiichiro Tamaki, Otsu (JP); Yasuo Kubota, Otsu (JP); Toshiyuki Nonaka, Tokyo (JP)

(73) Assignee: TORAY INDUSTRIES, INC., Tokyo (JP)

(*) Notice: Subject to any disclaimer, the term of this patent is extended or adjusted under 35 U.S.C. 154(b) by 137 days.

(21) Appl. No.: 14/410,827

(22) PCT Filed: Jun. 28, 2013

(86) PCT No.: PCT/JP2013/067813
§ 371 (c)(1),
(2) Date: Dec. 23, 2014

(87) PCT Pub. No.: WO2014/007161
PCT Pub. Date: Jan. 9, 2014

(65) Prior Publication Data
US 2015/0325848 A1 Nov. 12, 2015

(30) Foreign Application Priority Data

Jul. 6, 2012 (JP) ................................ 2012-152605

(51) Int. Cl.
*H01M 10/0525* (2010.01)
*H01M 4/133* (2010.01)
(Continued)

(52) U.S. Cl.
CPC .......... *H01M 4/366* (2013.01); *H01M 4/133* (2013.01); *H01M 4/134* (2013.01); *H01M 4/364* (2013.01);
(Continued)

(58) Field of Classification Search
CPC .. H01M 10/0525; H01M 4/133; H01M 4/134; H01M 4/364; H01M 4/366;
(Continued)

(56) References Cited

U.S. PATENT DOCUMENTS 7,141,334 B2   11/2006  Fukui
2002/0164479 A1  11/2002  Matsubara
(Continued)

FOREIGN PATENT DOCUMENTS

JP  2001160392   6/2001
JP  2002255530   9/2002
(Continued)

OTHER PUBLICATIONS

Liu, N., et al. "A Yolk-Shell Design for Stabilized and Scalable Li-Ion Battery Alloy Anodes", Nano Letters, vol. 12, pp. 3315-3321, published May 2, 2012.*
(Continued)

*Primary Examiner* — Sarah A. Slifka
*Assistant Examiner* — Lilia Nedialkova
(74) *Attorney, Agent, or Firm* — RatnerPrestia

(57) ABSTRACT

The present invention provides a negative electrode material for a lithium ion secondary battery, a composite negative electrode material for a lithium ion secondary battery, a resin composition for a lithium ion secondary battery negative (Continued)

electrode, and a negative electrode for a lithium ion secondary electrode, which may provide high charge/discharge capacity, and excellent initial charge-discharge characteristics and capacity retention. The surfaces of core particles of silicon of 5 nm or more and 100 nm or less in average particle size are coated with a coating layer to use a negative electrode material containing substantially no silicon oxide in the coating layer, or a composite negative electrode material for a lithium ion secondary battery, which includes the negative electrode material and a matrix material, further with the use of a polyimide resin or a precursor thereof as a bonding resin, thereby making it possible to achieve high charge/discharge capacity and excellent capacity retention, as well as high initial efficiency.

11 Claims, 1 Drawing Sheet

(51) Int. Cl.
| | |
|---|---|
| *H01M 4/134* | (2010.01) |
| *H01M 4/36* | (2006.01) |
| *H01M 4/38* | (2006.01) |
| *H01M 4/587* | (2010.01) |
| *H01M 4/62* | (2006.01) |
| *H01M 4/02* | (2006.01) |

(52) U.S. Cl.
CPC ......... *H01M 4/386* (2013.01); *H01M 4/587* (2013.01); *H01M 4/622* (2013.01); *H01M 4/625* (2013.01); *H01M 10/0525* (2013.01); H01M 2004/021 (2013.01); H01M 2004/027 (2013.01); Y02T 10/7011 (2013.01)

(58) Field of Classification Search
CPC ...... H01M 4/386; H01M 4/587; H01M 4/622; H01M 4/625; H01M 2004/021; H01M 2004/027; Y02T 10/7011
See application file for complete search history.

(56) References Cited

U.S. PATENT DOCUMENTS

| | | | |
|---|---|---|---|
| 2003/0118905 A1 | 6/2003 | Fukuoka | |
| 2003/0215711 A1 | 11/2003 | Aramata et al. | |
| 2005/0214644 A1 | 9/2005 | Aramata | |
| 2006/0040182 A1* | 2/2006 | Kawakami | H01M 4/38 429/218.1 |
| 2007/0099081 A1 | 5/2007 | Matsuda | |
| 2010/0120179 A1* | 5/2010 | Zhamu | H01M 4/134 438/19 |
| 2010/0243951 A1 | 9/2010 | Watanabe | |
| 2012/0077087 A1* | 3/2012 | Cho | H01M 4/133 429/219 |
| 2014/0120399 A1* | 5/2014 | Balandin | H01M 2/1016 429/120 |

FOREIGN PATENT DOCUMENTS

| | | |
|---|---|---|
| JP | 2003109589 | 4/2003 |
| JP | 2004063433 | 2/2004 |
| JP | 2005310759 | 11/2005 |
| JP | 2007294423 | 11/2007 |
| JP | 4033720 | 1/2008 |
| JP | 2010225494 | 10/2010 |
| JP | 2011198614 | 10/2011 |
| JP | 5648070 B | 11/2014 |
| TW | 200509436 A | 3/2005 |
| WO | 2012075960 | 6/2012 |

OTHER PUBLICATIONS

Kim, H. et al. "Three-Dimensional Porous Silicon Particles for Use in High-Performance Lithium Secondary Batteries", Angewandte Chemie, vol. 47, pp. 10151-10154, published Nov. 17, 2008.*
Kim, H. and J. Cho, "Superior Lithium Electroactive Mesoporous Si@Carbon Core-Shell Nanowires for Lithium Battery Anode Material", Nano Letters, vol. 8, pp. 3688-3691, published Oct. 25, 2008.*
Chan, C. et al. "Solution-Grown Silicon Nanowires for Lithium-Ion Battery Anodes", ACS Nano, vol. 4, pp. 1443-1450, published Mar. 4, 2010.*
Chan, C.K., et al. "Surface Chemistry and Morphology of the Solid Electrolyte Interphase on Silicon Nanowire Lithium-ion Battery Anodes", Journal of Power Sources, vol. 189, pp. 1132-1140, published Jan. 19, 2009.*
Dimov et al., "Characterization of carbon-coated silicon—Structural evolution and possible limitations," Journal of Power Sources, vol. 114, No. 1, Feb. 2003, pp. 88-95, XP004412810.
Extended European Search Report dated Sep. 10, 2014 for European Application No. 13813641.1.
Hyejung et al., "A Critical Size of Silicon Nano-Anodes for Lithium Rechargeable Batteries," Angewandte Chemie International Edition, vol. 49, No. 12, Mar. 2010, pp. 2146-2149, XP 055137393.
International Search Report for International Application No. PCT/JP2013/067813 dated Sep. 10, 2013.
Lee et al., "Carbon-coated nano-Si dispersed oxides/graphite composites as anode material for lithium ion batteries," Electrochemistry Communications, vol. 6, Apr. 2004, pp. 465-469, XP002430158.
Written Opinion of the International Searching Authority for International Application No. PCT/JP2013/067813 dated Sep. 10, 2013.
Taiwan Office Action and English translation dated Nov. 15, 2016 for corresponding Taiwan application No. 102233917, 8 pages.

* cited by examiner

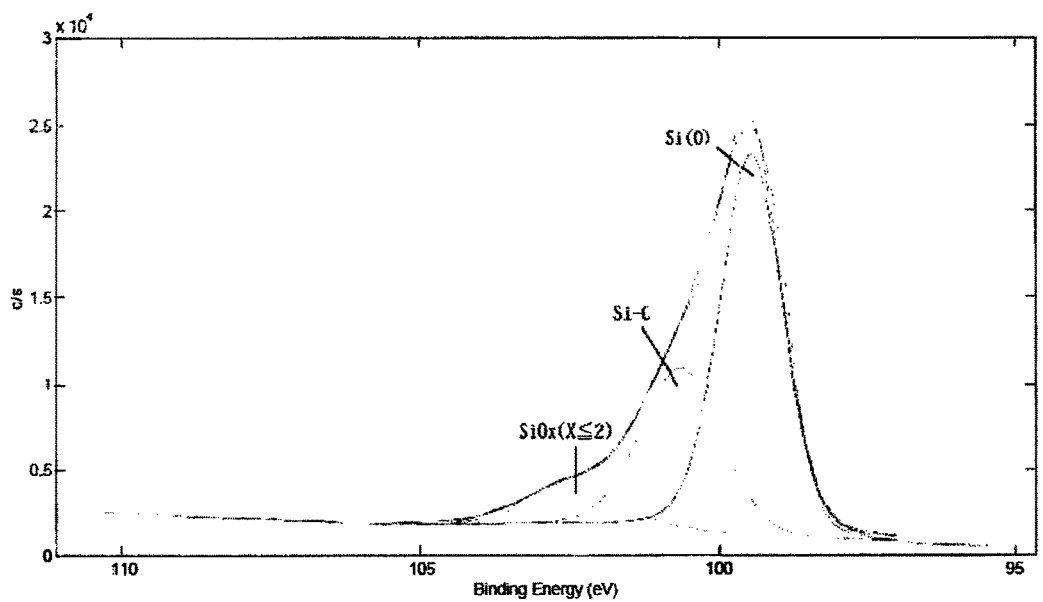

NEGATIVE ELECTRODE MATERIAL FOR LITHIUM ION SECONDARY BATTERY, COMPOSITE NEGATIVE ELECTRODE MATERIAL FOR LITHIUM ION SECONDARY BATTERY, RESIN COMPOSITION FOR LITHIUM ION SECONDARY BATTERY, NEGATIVE ELECTRODE FOR LITHIUM ION SECONDARY BATTERY, AND LITHIUM ION SECONDARY BATTERY

CROSS REFERENCE TO RELATED APPLICATIONS

This is the U.S. National Phase application of PCT/JP2013/067813, filed Jun. 28, 2013, which claims priority to Japanese Patent Application No. 2012-152605, filed Jul. 6, 2012, the disclosures of these applications being incorporated herein by reference in their entireties for all purposes.

TECHNICAL FIELD OF THE INVENTION

The present invention relates to a negative electrode material for a lithium ion secondary battery, a composite negative electrode material for a lithium ion secondary battery, a resin composition for a lithium ion secondary battery negative electrode, a negative electrode for a lithium ion secondary electrode, and a lithium ion secondary battery.

BACKGROUND OF THE INVENTION

In recent years, with the explosive popularization of notebook-size personal computers and personal digital assistants, demands have been prompted for rechargeable small-size, light-weight, high-capacity, high energy density, and highly reliable secondary batteries. Further, in automobile industry, there have been great expectations to reduce carbon dioxide emissions by the introduction of electric vehicles (EV) and hybrid electric vehicles (HEV), and the development of secondary batteries for driving motors has been also actively carried out, which holds the key to practical use of the vehicles. In particular, lithium ion secondary batteries considered to have the highest theoretical energy among batteries have been attracting attention, and rapid development of the batteries has been now advanced rapidly.

The lithium ion secondary battery is typically configured to have a positive electrode obtained by applying a positive electrode active material such as composite oxide including lithium onto a current collector such as aluminum with the use of a binder and a negative electrode obtained by applying a negative electrode active material capable of storing and releasing lithium ions onto a current collector such as copper with the use of a binder, and to have the positive electrode and negative electrode connected and hermetically sealed with a separator and an electrolyte layer interposed therebetween.

For increasing the capacity and energy density of the lithium ion secondary battery, the use of metals such as silicon, tin, and aluminum forming alloys with lithium ions, as well as oxides thereof, in addition to graphite materials widely used conventionally has been considered for the negative electrode active material. In particular, negative electrode active materials containing silicon are high in theoretical capacity per unit mass, and expected to be significantly improved in energy density, and both silicon and silicon oxides have thus been actively considered.

On the other hand, the negative electrode active materials containing silicon are known to have the problems of high volume expansion with the storage of lithium ions, and the electrode conductivity decreased, that is, the capacity retention decreased with the expansion and contraction of the electrode when the absorption and desorption of lithium ions are repeated, and there is strong demand for solutions to solve the problems.

As an approach to solving the problems, for example, the use of, as an active material, a silicon oxide SiOx ($1 \leq x < 1.6$) powder with the surface coated with a conductive film by a chemical vapor deposition treatment has been proposed (Patent Document 1). According to this method, it is proposed that the formation of the conductive film on the powder surface by the chemical vapor deposition treatment ensures electrode conductivity, while the failure to improve the conductivity decreased by internal collapse of the active material due to expansion and contraction, as well as the initial discharge capacity significantly decreased with respect to the initial charge capacity, that is, the decreased initial efficiency still exist as problems.

Against the problems, it is disclosed that the use of, as an active material, particles structured to have silicon nanoparticles dispersed in silicon oxide reduces the sizes of the silicon particles dispersed in silicon oxide to prevent the internal collapse of the active material due to expansion and contraction and improve the capacity retention (Patent Document 2), or that etching under an acidic atmosphere reduces the silicon oxide constituent to improve the initial efficiency (Patent Document 3).

Furthermore, examples related to the improvement in initial efficiency and focused on the contained oxygen amount of active material particles include Patent Document 4. The invention in question has a feature that an active material layer including active material particles containing silicon and/or a silicon alloy, and a binder is placed on the surface of a current collector composed of conductive metal foil, and then subjected to sintering under a non-oxidizing atmosphere so that the oxygen content of the active material particles is 0.5 weight % or less.

In addition, Patent Document 5 discloses, as a method for obtaining silicon particles containing no oxygen, a method of obtaining a spherical silicon powder by applying a reduction treatment to a spherical silica powder of 1 to 100 nm in average particle size obtained by applying flame hydrolysis to a gas mixture of silicon chloride or silane, oxygen, and hydrogen mixed.

PATENT DOCUMENTS

Patent Document 1: Japanese Patent Laid-open Publication No. 2004-63433
Patent Document 2: Japanese Patent Laid-open Publication No. 2007-294423
Patent Document 3: Japanese Patent Laid-open Publication No. 2010-225494
Patent Document 4: Japanese Patent No. 4033720
Patent Document 5: Japanese Patent Laid-open Publication No. 2003-109589

SUMMARY OF THE INVENTION

The method in Patent Document 2 has the possibility of improving the capacity retention with the silicon particle size reduced, but has not succeeded in improving the initial efficiency, because of containing the silicon oxide constituent in large amount.

The method of etching the silicon oxide in Patent Document 3 improves the initial efficiency to some extent, but has a significantly large amount of remaining silicon oxide still with a molar ratio of oxygen/silicon on the order of 0.7 to 0.9, thus leaving the problem with the initial efficiency unsolved.

In Patent Document 4, the active material particles have an oxygen content of 0.5 weight % or less, and thus have the possibility of being able to suppress the decrease in initial efficiency, but have an average particle size of 1 μm or more and 10 μm or less for the reduction in surface ratio with respect to all of the particles in order to prevent any silicon oxide from being formed on the surface of the silicon powder by natural oxidation, and the capacity retention is thus not adequate for practical use.

The method in Patent Document 5 achieves a relatively favorable capacity retention, because the obtained spherical silicon particles have a very small average particle size of 1 to 100 nm. However, because of the small particle sizes and large surface area of the silicon particles, the proportion of the surface silicon oxide by natural oxidation is increased to decrease the initial efficiency.

The challenge to be resolved by the present invention is to achieve a balance between the reduction in silicon particle size and the reduction of the silicon oxide constituent, thereby improving both the capacity retention and the initial efficiency. Further, an object of the present invention is to provide a negative electrode material for a lithium ion secondary battery, a composite negative electrode material for a lithium ion secondary battery, a resin composition for a lithium ion secondary battery negative electrode, a negative electrode for a lithium ion secondary electrode, and a lithium ion secondary battery, which are excellent in charge/discharge capacity, capacity retention, and initial efficiency.

Although it has been extremely difficult to achieve a balance between the reduction in silicon particle size and the reduction of the silicon oxide constituent, the inventors have focused attention on natural oxidation, and step up efforts for preventing this natural oxidation. Then, the inventors have conceived the idea that the natural oxidation is prevented by conductive film formation through a chemical vapor deposition treatment which has been conventionally carried out to ensure electrode conductivity. Thus, the conductive film formation through the chemical vapor deposition treatment conventionally applied only to stable silicon oxide powders has been applied to unstable silicon particles which are small in particle size and likely to be naturally oxidized.

More specifically the present invention provides a negative electrode material for a lithium ion secondary battery, which includes: core particles of silicon; and a coating layer of carbon coating surfaces of the core particles of the silicon, has a feature that the core particles of the silicon are 5 nm or more and 100 nm or less in average particle size, and a peak area for silicon carbide near 104 eV is smaller than 25% of the sum of peak areas for silicon and silicon-carbon near 100 eV in electron spectroscopy for chemical analysis.

Embodiments of the present invention may provide a negative electrode material for a lithium ion secondary battery, a composite negative electrode material for a lithium ion secondary battery, a resin composition for a lithium ion secondary battery negative electrode, and a negative electrode for a lithium ion secondary electrode, which may be excellent in charge/discharge capacity, capacity retention, and initial efficiency.

BRIEF DESCRIPTION OF THE DRAWING

The FIGURE shows electron spectroscopy for chemical analysis data (after peak division) of a negative electrode material prepared by the method of Example 1.

DESCRIPTION OF EMBODIMENTS OF THE INVENTION

In a negative electrode material for a lithium ion secondary battery according to an embodiment of the present invention (which, hereinafter, may be simply referred to as a "negative electrode material according to the present invention"), core particles of silicon are 5 nm or more and 100 nm or less in average particle size.

If the average particle size is less than 5 nm, there is a possibility that dispersibility will be worsened when a paste is produced by mixing the material with a binder resin and a solvent, or coating properties will be decreased when a current collector is coated with the paste. On the other hand, if the average particle size is greater than 100 nm, there is a possibility that the capacity retention will be worsened by the core particles finely divided with charge-discharge cycles, or the decreased capability of binding with a current collector, due to the increased absolute amount of local change in volume. The core particles of silicon more preferably fall within the range of 10 nm or more and 50 nm or less, further preferably fall within the range of 10 nm or more and 30 nm or less in average particle size. It is to be noted that the "average particle size" means the number average particle size in the present invention.

The particle size distribution for the core particles of silicon preferably has particles of 100 nm or more within 5 mass %, more preferably has particles of 70 nm or more within 5 mass %, and further preferably has particles of 40 nm or more within 5 mass %.

The particle sizes of the core particles of silicon can be evaluated as equivalent circle diameters from projected areas of primary particles by identifying electron micrograph data from a SEM, a TEM, or the like with the use of particle size distribution measurement software with image analysis. For example, for a particle photograph taken with a SEM, the number average particle size, particle size distribution, etc. can be calculated from particle size data obtained by identifying primary particles contained in a SEM image of 0.5 to 10 μm$^2$ with the use of particle size distribution measurement software with image analysis, and evaluating individual particle sizes as equivalent circle diameters from projected areas of the primary particles. Examples of the particle size distribution measurement software with image analysis include "Mac-VIEW" from Mountech Co., Ltd. and "A-zo Kun" from Asahi Kasei Engineering Corporation.

In addition, the negative electrode material according to an embodiment of the present invention needs to have the core particles of silicon coated with a coating layer of carbon, and furthermore, the coating layer of carbon needs to contain therein substantially no silicon oxide. If the core particles of silicon have surfaces coated with no coating layer, there is a possibility that the silicon particle surfaces will be naturally oxidized to cause a decrease in initial efficiency. In particular, when silicon particles are finely divided down to a particle size of 100 nm or less in order to improve the capacity retention, the surface silicon oxide may have a more significant effect because the surface area is increased.

The coating layer containing therein substantially no silicon oxide herein may have a substantially small effect on the initial efficiency in battery characteristics, in particular, means that the peak area for the silicon oxide near 104 eV is 25% or less of the sum of silicon and silicon-carbon peak areas near 100 eV in electron spectroscopy for chemical analysis (ESCA) on the negative electrode material. In the electron spectroscopy for chemical analysis (ESCA), the peak area for the silicon oxide near 104 eV is more preferably 20% or less, and further preferably 10% or less of the sum of silicon and silicon-carbon peak areas near 100 eV, no silicon oxide peak is detected most preferably.

Even when the core particles of silicon have surfaces coated with the coating layer, a large amount of silicon oxide in the coating layer of carbon have the possibility of causing a decrease in initial efficiency as is under the effect of the surface silicon oxide, when lithium ions are stored. The coating layer of carbon herein is preferably entirely composed of carbon, but may contain other elements.

The coating layer of carbon is preferably 1 nm or more and 20 nm or less, and further preferably 2 nm or more and 10 nm or less in thickness. When the coating layer is less than 1 nm in thickness, it becomes difficult to effectively coat the surfaces of the core particles of silicon. When the coating layer is more than 20 nm in thickness, there is possibility that diffusion of lithium ions will be inhibited during charge and discharge. In addition, the decreased proportion of the core particles of silicon will decrease the capacity of the negative electrode material. The thickness of the coating layer for coating the surfaces of the core particles of silicon can be measured with the use of a transmission electron microscope (TEM).

The method for obtaining nanosized silicon particles is not particularly limited, and a chemical reduction method, a plasma jet method, a laser ablation method, a flame method, a direct-current arc plasma method, a high-frequency thermal plasma method; a laser pyrolysis method, etc. can be used. Further, the method for coating the surfaces of the core particles of silicon with the coating layer of carbon is also not particularly limited, and vacuum vapor deposition, ion plating, sputtering, thermal CVD, plasma CVD, optical CVD, etc. can be used. Furthermore, while the method for obtaining the silicon particles with the coating layer containing therein no silicon oxide is also not particularly limited, the coating layer may be formed by CVD or the like after reducing silicon particles with naturally oxidized surfaces by hydrogen reduction as a treatment before the formation of the coating layer, or the coating layer may be formed without exposing silicon particles prepared in vacuum or in an inactive atmosphere to any oxidizing atmosphere. When the carbon coating layer is formed by CVD or the like directly on silicon particles with surfaces containing a silicon oxide, there is a possibility that an oxide layer will be left inside to decrease battery characteristics.

Furthermore, the content of silicon carbide is preferably low in the silicon particles with the surfaces coated with the coating layer of carbon. The silicon carbide is naturally oxidized in the atmosphere to affect the initial efficiency as in the case of silicon oxide. The low content of silicon carbide may have a substantially small effect on the initial efficiency in battery characteristics, in particular, the peak area for the silicon carbide near 100.9 eV is preferably less than 100%, more preferably 70% or less, and further preferably 30% or less of the silicon peak area near 99.6 eV in electron spectroscopy for chemical analysis (ESCA).

The negative electrode material for a lithium ion secondary battery according to an embodiment of the present invention may be a composite negative electrode material containing a matrix material in addition to the silicon particles with the surfaces coated with the coating layer of carbon. The composite negative electrode material can ease volume expansion to improve the capacity retention. In addition, the negative electrode material can be increased in particle size to reduce the mixing ratio of a binder resin, and improve the dispersibility when a paste is produced by mixing the material with a binder resin and a solvent, and the coating properties when a current collector is coated with the paste.

The matrix material is not particularly limited as long as the material develops the effect described previously, but preferably at least partially contains a lithium ion-conducting and/or electron-conducting material, and preferably contains a material capable of storing and releasing lithium ions or thin-layer graphite.

Examples of the material capable of storing and releasing lithium ions include carbon materials such as graphite (artificial and natural), hard carbon, and soft carbon; tin, germanium, aluminum, indium, calcium, magnesium, and alloys and oxides thereof; lithium titanate, and the carbon materials or lithium titanate is preferred from the standpoints of initial efficiency and capacity retention.

In addition, the use of thin-layer graphite for the matrix material is particularly preferred, because a matrix structure can be achieved which is highly conductive with voids, and able to maintain the steric structure, making it possible to ease the volume expansion of the negative electrode material while having a high ion conductivity. The thin-layer graphite in the present invention is a structure of single-layer graphene stacked, which has a form of a flake. The thin-layer graphite is not particularly limited in terms of thickness, but preferably 20 nm or less, further preferably 10 nm or less from the standpoint of increasing conductive paths. Alternatively, the thin-layer graphite may be so-called graphene of one to several layers. The graphene is not limited in size in the layer direction, but preferably 100 nm or more and 10 µm or less.

The thin-layer graphite is able to be prepared by a mechanical peeling method, a chemical vapor deposition method, a epitaxial growth method and an redox method, etc. In addition, the thin-layer graphite is also available by purchasing commercial graphite (xGNP such as from XG Sciences, Inc.)

The composite negative electrode material containing the silicon particles with the surfaces coated with the coating layer of carbon, and the matrix material can be prepared in such a way that the silicon particles and the matrix material are mixed properly by a physical approach.

In the case of mixing with a substance capable of storing and releasing lithium ions, the composite negative electrode material can be obtained in such a way that the silicon particles with the surfaces coated with the coating layer of carbon and the substance capable of storing and releasing lithium ions are mixed, and milled with a ball mill, a vibration mill, a planetary ball mill, or the like in an inactive atmosphere such as argon and nitrogen.

When the substance capable of storing and releasing lithium ions is a graphite-like carbon material, the composite negative electrode material can be obtained in such a way that various types of resins, a polyimide precursor, and a small amount of carbon precursor such as tar or pitch are mixed with the silicon particles with the surfaces coated with the coating layer of carbon, and subjected to sintering under a non-oxidizing atmosphere, and the sintered product obtained is subjected to grinding and classification. In addition, a coating layer may be further formed on the surfaces of the obtained composite particles with the use of a chemical vapor deposition (CVD) method or the like.

In an embodiment of making a composite with the thin-layer graphite as the matrix material, the composite negative electrode material can be obtained in such a way that the silicon particles with the surfaces coated with the coating layer of carbon and the thin-layer graphite are milled with a ball mill, a vibration mill, a planetary ball mill, or the like in an inactive atmosphere such as argon and nitrogen. In addition, the composite negative electrode material is also obtained in such a way various types of resins, a polyimide precursor, a carbon precursor such as tar or pitch, etc. are mixed with the thin-layer graphite, and then mixed with the silicon particles with the surfaces coated with the coating layer of carbon, or can be also obtained by an approach in which a graphite oxide as a raw material for the thin-layer graphite is mixed, and then reduced to provide thin-layer graphite.

The graphite oxide is able to be prepared by oxidizing graphite, and Brodie method, Staudenmaier method, Hammers method, etc. are known. The fully oxidized graphite can be decreased in layer thickness, and reduced to prepare thin-layer graphite.

In the composite negative electrode material including the silicon particles with the surfaces coated with the coating layer of carbon and the matrix material, the silicon content is preferably 3 mass % to 50 mass %, further preferably 5 mass % to 40 mass %. The silicon content less than 3 mass % has the possibility of decreasing the effect of improvement in negative electrode capacity. In addition, the silicon content more than 50 mass % has the possibility of worsening the capacity retention by the decreased capability of binding with a current collector, due to the increased change of the composite negative electrode material in volume.

The composite negative electrode material including the silicon particles with the surfaces coated with the coating layer of carbon and the matrix material is preferably 0.5 µm to 20 µm in average particle size. When the substance capable of storing and releasing lithium ions is mixed to provide the composite negative electrode material, there is also a need to reduce, in size, the particles of the substance capable of storing and releasing lithium ions, which forma composite with the silicon particles, in order to make the average particle size for the composite particles smaller than 0.5 µm, and there is a possibility of causing difficulty in manufacturing.

In the case of the high-capacity negative electrode material or composite negative electrode material (hereinafter, which may be collectively referred to as a negative electrode material), the thickness of a film applied onto a current collector has the possibility of being reduced down to 40 µm or less, and when the composite particles are larger than 20 µm in average particle size, there is a possibility that the uniformity in coating will be decreased due to seam or scratch in coating, or the capability of binding with a current collector will be decreased due to the increased amount of change in the volume of the composite particles with charge-discharge cycles.

The negative electrode material according to an embodiment of the present invention can be mixed with a binding resin, a solvent, and further, if necessary, a conductive additives, applied to a current collector, and dried to create a negative electrode for a lithium ion battery.

As the binding resin, which is not particularly limited, thermoplastic resins such as polytetrafluoroethylene, polyvinylidene fluoride (PVdF), polyethylene, and polypropylene; rubber-elastic polymers such as styrene-butadiene rubber (SBR), nitrile-butadiene rubber, and fluorine-containing rubbers; polysaccharides such as carboxymethyl cellulose; polyimide precursors and/or polyimide resins, polyamideimide resins, polyamide resins, acrylic resins, polyacrylonitrile, etc. can be used as a single resin, or as mixtures of two or more thereof. Above all, the use of the polyimide precursors and/or polyimide resins, the polyamideimide resins, or the polyamide resins is preferred because the capability of binding with a current collector can be enhanced to improve the capacity retention. Above all, the polyimide precursors and/or polyimide resins are particularly preferred.

The polyimide precursor in an embodiment of the present invention refers to a resin that can be converted to a polyimide by a heating treatment or a chemical treatment, and examples of the polyimide precursor include, for example, polyamide acids and polyamide acid esters. The polyamide acid can be obtained by polymerizing a tetracarboxylic dianhydride and a diamine, whereas the polyamide acid ester can be obtained by polymerizing a dicarboxylic acid diester and a diamine, or reacting a carboxyl group of a polyamide acid with an esterification reagent. In addition, the polyimide in an embodiment of the present invention refers to a structure fully imidized already at the time of mixing with the negative electrode material.

Examples of the solvent can include, but not particularly limited to, N-methylpyrrolidon, γ-butyrolactone, propylene glycol dimethyl ether, ethyl lactate, cyclohexanone, and tetrahydrofurane. In addition, for the purpose of improving coating properties of a binder solution, solvents such as propylene glycol monomethyl ether acetate, various types of alcohols, methyl ethyl ketone, and methyl isobutyl ketone can be preferably contained at 1 to 30 weight % of the total solvent.

As the conductive additives, which is not particularly limited as long as the conductive additives is an electron conducting material that has no adverse effects on the battery performance, conductive materials can be used, e.g. carbon black such as furnace black, Ketjen Black, and acetylene black; graphite such as natural graphite (e.g. scale-like graphite), artificial graphite, and graphene; conductive fibers such as carbon fibers and metal fibers; and metal powders such as copper, nickel, aluminum, and silver.

The resin composition for a lithium ion secondary battery negative electrode according to an embodiment of the present invention can be obtained in such a way that a binder resin is mixed with a solvent, adjusted to an appropriate viscosity, and then adequately kneaded with the addition of the negative electrode material according to an embodiment of the present invention, and if necessary, a conductive additives, a surfactant, etc. For the kneading, uniform dispersion is preferably achieved by using a planetary centrifugal mixer, dispersing media in a beads mill, a ball mill, or the like, or using a three-roll mill or the like.

Further, the negative electrode for a lithium ion secondary battery according to an embodiment of the present invention can be obtained by binding the resin composition for a lithium ion secondary battery negative electrode according to an embodiment of the present invention to a current collector. A method for producing the negative electrode created from the resin composition for a lithium ion battery negative electrode according to an embodiment of the present invention will be described by citing an example.

The resin composition for a lithium ion secondary battery negative electrode according to an embodiment of the present invention is applied onto metal foil to have a thickness of 1 to 500 μm. Examples of the metal foil include aluminum foil, nickel foil, titanium foil, copper foil, and stainless-steel foil, and copper foil and aluminum foil are commonly used.

In order to apply the resin composition for a lithium ion secondary battery negative electrode according to an embodiment of the present invention to the metal foil, approaches can be used such as spin coat, roll coat, slit die coat, dip coat, and screen printing. The resin composition is typically applied onto both sides, it is thus common to first apply the composition onto one side, treat the solvent at a temperature of 50 to 400° C. for 1 minute to 20 hours in air, in an inert gas atmosphere such as nitrogen or argon, or in vacuum, and then apply and dry the composition onto the other side, while the composition can be applied simultaneously onto the both sides by an approach such as roll coat or slit die coat.

In the case of using a polyimide precursor as the binding resin, a reliable negative electrode can be obtained in such a way the composition is applied, and then subjected to a heat treatment at 100 to 500° C. for 1 minute to 24 hours to convert a polyimide precursor to a polyimide. The heat treatment condition is preferably 200 to 450° C. for 30 minutes to 20 hours. In addition, the heat treatment is preferably carried out in an inert gas such as a nitrogen gas or in vacuum in order to suppress incorporation of moisture.

EXAMPLES

While examples will be given below for describing embodiments of the present invention in further detail, the present invention is not to be considered limited by these examples.

Example 1

[Preparation of Negative Electrode Material]

Silicon oxide at the surfaces of silicon particles synthesized by a high-frequency thermal plasma method and subjected to a slowl oxidation treatment was reduced under the condition of: a reduction temperature of 700° C. in a nitrogen atmosphere with 40 volume % of hydrogen to obtain silicon particles without any oxide film. Subsequently, the surfaces of the silicon particles were coated with pyrolytic carbon under the condition of: a treatment temperature of 1000° C. with methane:nitrogen=1:1 as a raw material gas. The thus obtained negative electrode material was observed under a scanning electron microscope, and from the obtained image, the average particle size was calculated with the use of particle size distribution measurement software with image analysis (from Mountech Co., Ltd., Mac-VIEW). In addition, the thickness of the coating layer formed on the surfaces of the silicon particles was measured with a transmission electron microscope. As a result, obtained were silicon particles of 15 nm in average particle size with the surfaces coated with the 5 nm coating layer of carbon.

[Electron Spectroscopy for Chemical Analysis (ESCA) on Negative Electrode Material]

The negative electrode material obtained was subjected to electron spectroscopy for chemical analysis to obtain the ratio of the peak area for silicon oxide to the sum of the peak areas for silicon and silicon carbide, which was 9% (see FIGURE). In addition, the peak area for silicon carbide was 60% of the peak area for silicon.

[Preparation of Composite Negative Electrode Material]

The obtained negative electrode material was mixed with the addition of graphite of 1 μm in average particle size and carbon pitch, subjected to firing at 900° C. under an argon atmosphere, and to a grinding treatment, and then subjected to classification to obtain a composite negative electrode material of 10 μm in average particle size. The silicon in the composite negative electrode material was 15% in percentage by mass.

[Synthesis of Polyimide Precursor]

Under a nitrogen atmosphere, 10.01 g (0.05 mol) of 4,4'-diaminodiphenylether, 5.4 g (0.05 mol) of p-phenylenediamine, and 120 g of N-methylpyrrolidon (NMP) were added in a four-necked flask, and the diamines were dissolved at room temperature. Then, 28.69 g (0.975 mol) of 3,3',4,4'-biphenyltetracarboxylic dianhydride and 12.3 g of NMP were added thereto, and stirred at 60° C. for 6 hours. After 6 hours, the solution was cooled to room temperature, and NMP was added to finally obtain a polyimide precursor solution of 20% in solid content concentration.

[Preparation of Negative Electrode]

In an appropriate amount of NMP, 80 parts by weight of the obtained composite negative electrode material, 75 parts by weight of the polyimide precursor solution of 20% in solid content concentration, and 5 parts by weight of acetylene black as a conductive additives were dissolved and stirred to obtain a slurry paste. The obtained paste was applied onto electrolytic copper foil with the use of a doctor blade, dried at 110° C. for 30 minutes, and pressed by a roll-pressing machine to provide an electrode. Furthermore, the coated section of the electrode was subjected to punching into a circle of 16 mm in diameter, and to vacuum drying at 200° C. for 24 hours to prepare a negative electrode.

[Preparation of Coin-Type Lithium Secondary Battery]

The negative electrode, and metal lithium as a counter electrode were used, and 1 M $LiPF_6$ and 3 mass % of vinylene carbonate added to a mixed solvent of ethylene carbonate:diethyl carbonate=7:3 (volume ratio) were used as an electrolyte solution. In addition, with the use of a cutout of 17 mm in diameter from CELGARD #2400 (from CELGARD) for a separator, a coin battery was prepared.

[Evaluation of Electrode Characteristics]

The negative electrode was charged up to 5 mV against the counter electrode (lithium electrode) with a current corresponding to 0.3 C. The negative electrode was discharged down to 2.0 V against the counter electrode (lithium electrode) with a current corresponding to 0.3 C to measure the initial (first) discharge capacity. The discharge capacity was regarded as a capacity at a cut voltage of 1.4 V. In this way, the obtained initial charge capacity and initial discharge capacity were used to figure out the initial efficiency from the following formula.

$$\text{Initial Efficiency}(\%)=\{(\text{Initial Discharge Capacity (mAh/g)/Initial Charge Capacity (mAh/g)}\}\times 100$$

In addition, this charge-discharge measurement was made 50 times to calculate the ratio of 50-th discharge capacity to the first discharge capacity as a capacity retention (%). Table 1 shows the obtained initial charge capacity, initial discharge capacity, initial efficiency, and capacity retention.

Example 2, Example 3

Negative electrode materials were obtained by coating the surfaces of silicon particles of 40 nm (Example 2) and 80 nm (Example 3) in average particle size with a 5 nm carbon coating layer. The negative electrode material obtained was subjected to electron spectroscopy for chemical analysis to obtain the ratio of the peak area for silicon oxide to the sum of the peak areas for silicon and silicon carbide, which was 9%. In addition, the peak area for silicon carbide was 60% of the peak area for silicon.

The respective electrode characteristics were evaluated in the same way as in Example 1, except that the negative electrodes described above were used to prepare composite negative electrode materials. Table 1 shows the obtained initial charge capacity, initial discharge capacity, initial efficiency, and capacity retention.

Example 4

Except that a composite negative electrode material of 10 μm in average particle size with 5% of silicon in percentage by mass was used with the use of a negative electrode material by coating the surfaces of silicon particles of 40 nm in average particle size with a 5 nm carbon coating layer, electrode characteristics were evaluated in the same way as in Example 1. Table 1 shows the obtained initial charge capacity, initial discharge capacity, initial efficiency, and capacity retention.

Example 5

Obtained was a negative electrode material including silicon particles of 40 nm in average particle size with the surfaces coated with a 2 nm coating layer of carbon. The negative electrode material obtained was subjected to electron spectroscopy for chemical analysis to obtain the ratio of the peak area for silicon oxide to the sum of the peak areas for silicon and silicon carbide, which was 6%. In addition, the peak area for silicon carbide was 60% of the peak area for silicon. Except that a composite negative electrode material of 10 μm in average particle size with 40% of silicon in percentage by mass is used with the addition of only carbon pitch to the negative electrode material, electrode characteristics were evaluated in the same way as in Example 1. Table 1 shows the obtained initial charge capacity, initial discharge capacity, initial efficiency, and capacity retention.

Example 6

Obtained was a negative electrode material including silicon particles of 40 nm in average particle size with the surfaces coated with a 15 nm coating layer of carbon. The negative electrode material obtained was subjected to electron spectroscopy for chemical analysis to obtain the ratio of the peak area for silicon oxide to the sum of the peak areas for silicon and silicon carbide, which was 4%. In addition, the peak area for silicon carbide was 60% of the peak area for silicon. Except that a composite negative electrode material of 10 μm in average particle size with 4% of silicon in percentage by mass is used with the addition of only carbon pitch to the negative electrode material, the respective electrode characteristics were evaluated in the same way as in Example 1. Table 1 shows the obtained initial charge capacity, initial discharge capacity, initial efficiency, and capacity retention.

Example 7

Except that a negative electrode material was used which was obtained by coating the surfaces of silicon particles of 40 nm in average particle size with a 5 nm carbon coating layer, and that a mixture of carbon pitch and thin-layer graphite (XGNP, product number: M-5, from XG Sciences, Inc.) mixed at 9:1 in ratio by weight was used in place of the use of carbon pitch and graphite in the preparation of the composite negative electrode material, the respective electrode characteristics were evaluated in the same way as in Example 1. Table 1 shows the obtained initial charge capacity, initial discharge capacity, initial efficiency, and capacity retention.

Example 8

Except that with the use of a negative electrode material of silicon particles of 40 nm in average particle size with the surfaces coated with a 5 nm carbon coating layer, the silicon particles and thin-layer graphite (XGNP, product number: M-5, from XG Sciences, Inc.) were mixed in a ball mill, and subjected to a grinding treatment, and then to classification to obtain a composite negative electrode material of 10 μm in average particle size with 15% of silicon in percentage by mass with the respect to the composite negative electrode material, the respective electrode characteristics were evaluated in the same way as in Example 1. Table 1 shows the obtained initial charge capacity, initial discharge capacity, initial efficiency, and capacity retention.

Example 9

Except that with the use of a negative electrode material of silicon particles of 40 nm in average particle size with the surfaces coated with a 5 nm carbon coating layer, a graphite oxide and the negative electrode material were mixed, subjected to firing under the condition of a firing temperature: 700° C. in a nitrogen atmosphere with 3 volume % of hydrogen, and subjected to a grinding treatment, and then to classification in the preparation of the composite negative electrode material to obtain a composite negative electrode material of 10 μm in average particle size with 15% of silicon in percentage by mass with the respect to the composite negative electrode material, the respective electrode characteristics were evaluated in the same way as in Example 1. Table 1 shows the obtained initial charge capacity, initial discharge capacity, initial efficiency, and capacity retention.

Example 10

Except that the surfaces of silicon particles of 40 nm in average particle size were coated with a 5 nm carbon coating layer to use a negative electrode material in which the ratio of the peak area for silicon oxide was 22% to the sum of the peak areas for silicon and silicon carbide, the respective electrode characteristics were evaluated in the same way as in Example 2. Table 1 shows the obtained initial charge capacity, initial discharge capacity, initial efficiency, and capacity retention.

Example 11

For obtaining a negative electrode material including silicon particles of 40 nm in average particle size with the surfaces coated with a 5 nm coating layer of carbon, the condition for coating with pyrolytic carbon was a treatment temperature of 750° C. with the use of acetylene:nitrogen=1:1 as a raw material gas. The negative electrode material obtained was subjected to electron spectroscopy for chemical analysis to obtain the ratio of the peak area for silicon oxide to the sum of the peak areas for silicon and silicon carbide, which was 9%. In addition, the peak area for silicon carbide was 20% of the peak area for silicon. Except for using the thus obtained negative electrode material, the respective electrode characteristics were evaluated in the same way as in Example 2. Table 1 shows the obtained initial charge capacity, initial discharge capacity, initial efficiency, and capacity retention.

Comparative Example 1

With high-purity monosilane $SiH_4$ as a raw material and helium, argon, and hydrogen as a diluent gas, polycrystalline silicon particles were obtained by a reductive pyrolysis method at a reaction temperature of 620° C. The polycrystalline silicon particles subjected to a slowl oxidation treatment were 200 nm and 40 nm respectively in average particle size and crystallite size, and subjected to electron spectroscopy for chemical analysis to obtain the ratio of the peak area for silicon oxide to the sum of the peak areas for silicon and silicon carbide, which was 120%.

The obtained polycrystalline silicon particles, graphite of 1 μm in average particle size, and carbon pitch were added and mixed to obtain a composite negative electrode material in the same way as in Example 1. Subsequently, as in Example 1, a negative electrode and then a lithium secondary battery were prepared to evaluate electrode characteristics. Table 1 shows the obtained initial charge capacity, initial discharge capacity, initial efficiency, and capacity retention.

Comparative Example 2

The polycrystalline silicon particles subjected to the slowl oxidation treatment, which was obtained in Comparative Example 1, was coated with pyrolytic carbon as in Example 1 to obtain silicon particles of the polycrystalline silicon particles of 200 nm in average particle size and 40 nm in crystallite size with the surfaces coated with a 5 nm coating layer of carbon. Except for using the silicon particles as a negative electrode material, a composite negative electrode material, a negative electrode, and then a lithium secondary battery were prepared to evaluate electrode characteristics as in Example 1. Table 1 shows the obtained initial charge capacity, initial discharge capacity, initial efficiency, and capacity retention.

Comparative Example 3

As in Example 1 except that silicon particles of 40 nm in average particle size synthesized by a high-frequency thermal plasma method and subjected to a slowl oxidation treatment were used as a negative electrode material, more specifically, the silicon particles were used for a negative electrode material without reducing silicon oxide on the surfaces or without forming any coating layer of pyrolytic carbon to prepare a composite negative electrode material, a negative electrode, and then a lithium secondary battery, and evaluate electrode characteristics. For the negative electrode used, the ratio of the peak area for silicon oxide was 120% to the sum of the peak areas for silicon and silicon carbide, which was obtained by electron spectroscopy for chemical analysis. Table 1 shows the initial charge capacity, initial discharge capacity, initial efficiency, and capacity retention, which are obtained by the electrode characteristic evaluations.

Comparative Example 4

Except that the surfaces of silicon particles of 40 nm in average particle size synthesized by a high-frequency thermal plasma method and subjected to a slowl oxidation treatment were coated with a 5 nm coating layer of pyrolytic carbon to use the silicon particles as a negative electrode material, a composite negative electrode material, a negative electrode, and then a lithium secondary battery were prepared to evaluate electrode characteristics as in Example 1. Table 1 shows the obtained initial charge capacity, initial discharge capacity, initial efficiency, and capacity retention.

TABLE 1

| | Material Composition of Composite Negative Electrode | | | | | | Negative Electrode Characteristics | | | |
|---|---|---|---|---|---|---|---|---|---|---|
| | Particle Size for Silicon Particles | Silicon Oxide Peak Area | Silicon Carbide Peak Area | Coating of Silicon Particle Surface | Silicon Ratio (mass %) | Binder | Initial Charge Capacity (mAh/g) | Initial Discharge Capacity (mAh/g) | Initial Efficiency | Capacity Maintenance Rate |
| Example 1 | 15 nm | 9% | 60% | 5 nm Carbon | 15% | Polyimide | 900 | 806 | 90% | 94% |
| Example 2 | 40 nm | 9% | 60% | 5 nm Carbon | 15% | Polyimide | 900 | 811 | 90% | 88% |
| Example 3 | 80 nm | 9% | 60% | 5 nm Carbon | 15% | Polyimide | 900 | 822 | 91% | 80% |
| Example 4 | 40 nm | 9% | 60% | 5 nm Carbon | 5% | Polyimide | 550 | 511 | 93% | 91% |
| Example 5 | 40 nm | 6% | 60% | 2 nm Carbon | 40% | Polyimide | 1740 | 1552 | 89% | 82% |
| Example 6 | 40 nm | 4% | 60% | 15 nm Carbon | 4% | Polyimide | 500 | 467 | 93% | 92% |
| Example 7 | 40 nm | 9% | 60% | 5 nm Carbon | 15% | Polyimide | 900 | 813 | 91% | 90% |
| Example 8 | 40 nm | 9% | 60% | 5 nm Carbon | 15% | Polyimide | 900 | 815 | 90% | 90% |
| Example 9 | 40 nm | 9% | 60% | 5 nm Carbon | 15% | Polyimide | 900 | 812 | 90% | 91% |
| Example 10 | 40 nm | 22% | 60% | 5 nm Carbon | 15% | Polyimide | 900 | 670 | 78% | 89% |
| Example 11 | 40 nm | 9% | 20% | 5 nm Carbon | 15% | Polyimide | 900 | 835 | 93% | 88% |
| Comparative Example 1 | 200 nm | 120% | 60% | No | 15% | Polyimide | 900 | 574 | 64% | 63% |
| Comparative Example 2 | 200 nm | 120% | 60% | 5 nm Carbon | 15% | Polyimide | 900 | 599 | 67% | 66% |
| Comparative Example 3 | 40 nm | 120% | 60% | No | 15% | Polyimide | 900 | 466 | 52% | 81% |
| Comparative Example 4 | 40 nm | 120% | 60% | 5 nm Carbon | 15% | Polyimide | 900 | 507 | 56% | 83% |

Examples 1 to 11 and Comparative Examples 1 to 4 were compared to demonstrate the following.

Attention is focused on whether or not silicon oxide is obtained in the coating layer of carbon, to compare the examples of the comparative examples. Examples 1 to 11 with the use of, as the negative electrode material, the composite negative electrode material containing substantially no silicon oxide in the coating layer of carbon has a high initial efficiency of 78% to 93%, while Comparative Examples 1 to 4 are inferior in initial efficiency, which is 52% to 67%. In particular, Comparative Examples 3 and 4 with the silicon particles of 40 nm in particle size are particularly inferior, even as compared with Comparative Examples 1 and 2 with the silicon particles of 200 nm in particle size. Comparative Examples 3 and 4 are considered to be significantly affected by surface oxide, because the silicon particles are small in particle size with large surface areas. More specifically, the use of the negative electrode material containing substantially no silicon oxide in the coating layer of carbon has succeeded in achieving an electrode with high initial efficiency.

When attention is focused on the particle size for the silicon particles, Examples 1 to 11 as well as Comparative Examples 3 and 4 with the silicon particles smaller than 100 nm in particle size have a high capacity retention of 80% to 94%, while Comparative Examples 1 and 2 with the silicon particles larger than 100 nm in particle size are extremely inferior in capacity retention, which is 63% to 66%. Comparative Examples 3 and 4 are relatively high in capacity retention, but extremely inferior in initial efficiency as described previously, and thus not put into practical use. More specifically, the use of the negative electrode material including the silicon particles smaller than 100 nm in particle size and containing substantially no silicon oxide in the coating layer of carbon has succeeded in achieving an electrode with high capacity retention and initial efficiency.

When Examples 1 to 3 are compared in terms of capacity retention, Example 2 with the silicon particles smaller than 50 nm in particle size, and further, Example 1 with the silicon particles smaller than 30 nm in particle size are superior in capacity retention, as compared with Example 3 with the silicon particles smaller than 100 nm in particle size.

When Examples 2, 4, 5, and 6 with the same silicon particles of 40 nm in particle size are compared with each other, all of the examples exhibit favorable characteristics in both initial efficiency and capacity retention, but more favorable characteristics are exhibited as the silicon ratio is lower. On the other hand, it is determined that the charge capacity is higher as the silicon ratio is higher. When the silicon ratio is lower than 3 mass %, the charge/discharge capacity is decreased to reduce the advantage as a high-capacity negative electrode. More specifically, it is determined that the silicon ratio is preferably higher than 3 mass %. On the other hand, when the silicon ratio is greater than 50 mass %, there is concern about decreases in initial efficiency and capacity retention. Therefore, it has been determined that the mass ratio of silicon is preferably 3 mass % to 50 mass %. In addition, when it is necessary to increase the silicon ratio, there is a possibility of making it impossible to ensure the film thickness of the coating layer of carbon for suppressing surface oxidation. On the other hand, when the coating layer of carbon is thicker than 20 nm in film thickness, there is a possibility that the silicon ratio will be decreased to reduce the charge/discharge capacity. Therefore, it has been determined that the coating layer of carbon is preferably 1 nm or more and 20 nm or less in film thickness.

Further, it has been determined that when Example 2 which differs only in matrix material with the same silicon particle size and carbon film thickness is compared with Examples 7 to 9, the at least partially contained thin-layer graphite is more favorable, in particular, in terms of capacity retention, than the use of the graphite-like material as the matrix material.

In addition, it has been determined that when Example 2 which differs only in the ratio of the peak area for silicon oxide to the sum of the peak areas for silicon and silicon carbide and in the ratio of the peak area for silicon carbide to the peak area for silicon with the same silicon particle size and carbon film thickness is compared with Examples 10 and 11, the initial efficiency is more favorable in the example where the peak area for silicon oxide and the peak area for silicon carbide are respectively smaller than the sum of the peak areas for silicon and silicon carbide and the peak area for silicon.

As just described, the use of the negative electrode material with the silicon particles smaller than 100 nm in particle size, and with the lower ratios of the peak areas for silicon oxide and silicon carbide in electron spectroscopy for chemical analysis (ESCA), further, the negative electrode material with the coating layer of carbon of 1 nm or more and 20 nm or less in film thickness, and the composite negative electrode material with the mass ratio of silicon from 3 mass % to 50 mass % has succeeded in obtaining electrodes with high capacity retention and initial efficiency.

Next, here are examples in the case of using polyvinylidene fluoride (PVdF) as a binder.

Examples 12 to 20, Comparative Examples 5 to 8

Except that the polyimide precursor solution was changed to a polyvinylidene fluoride solution for the preparation of the paste, and that the vacuum drying was changed from 200° C. for 24 hours to 130° C. for 1 hour for the preparation of the negative electrode, the respective electrode characteristics were evaluated in the same way as in Examples 1 to 9 and Comparative Examples 1 to 4. Table 2 shows the obtained initial charge capacity, initial discharge capacity, initial efficiency, and capacity retention.

TABLE 2

| | Material Composition of Composite Negative Electrode | | | | | | Negative Electrode Characteristics | | | |
|---|---|---|---|---|---|---|---|---|---|---|
| | Particle Size for Silicon Particles | Silicon Oxide Peak Area | Silicon Carbide Peak Area | Coating of Silicon Particle Surface | Silicon Ratio (mass %) | Binder | Initial Charge Capacity (mAh/g) | Initial Discharge Capacity (mAh/g) | Initial Efficiency | Capacity Maintenance Rate |
| Example 12 | 15 nm | 9% | 60% | 5 nm Carbon | 15% | PVDF | 900 | 671 | 74% | 60% |
| Example 13 | 40 nm | 9% | 60% | 5 nm Carbon | 15% | PVDF | 900 | 685 | 76% | 55% |
| Example 14 | 80 nm | 9% | 60% | 5 nm Carbon | 15% | PVDF | 900 | 746 | 83% | 51% |
| Example 15 | 40 nm | 9% | 60% | 5 nm Carbon | 5% | PVDF | 550 | 445 | 81% | 60% |
| Example 16 | 40 nm | 6% | 60% | 2 nm Carbon | 40% | PVDF | 1740 | 1329 | 76% | 54% |
| Example 17 | 40 nm | 4% | 60% | 15 nm Carbon | 4% | PVDF | 500 | 411 | 82% | 51% |

TABLE 2-continued

| | Material Composition of Composite Negative Electrode | | | | | | Negative Electrode Characteristics | | | |
|---|---|---|---|---|---|---|---|---|---|---|
| | Particle Size for Silicon Particles | Silicon Oxide Peak Area | Silicon Carbide Peak Area | Coating of Silicon Particle Surface | Silicon Ratio (mass %) | Binder | Initial Charge Capacity (mAh/g) | Initial Discharge Capacity (mAh/g) | Initial Efficiency | Capacity Maintenance Rate |
| Example 18 | 40 nm | 9% | 60% | 5 nm Carbon | 15% | PVDF | 900 | 712 | 79% | 59% |
| Example 19 | 40 nm | 9% | 60% | 5 nm Carbon | 15% | PVDF | 900 | 725 | 81% | 56% |
| Example 20 | 40 nm | 9% | 60% | 5 nm Carbon | 15% | PVDF | 900 | 721 | 80% | 60% |
| Comparative Example 5 | 200 nm | 120% | 60% | No | 15% | PVDF | 900 | 465 | 52% | 10% |
| Comparative Example 6 | 200 nm | 120% | 60% | 5 nm Carbon | 15% | PVDF | 900 | 486 | 54% | 15% |
| Comparative Example 7 | 40 nm | 120% | 60% | No | 15% | PVDF | 900 | 394 | 44% | 38% |
| Comparative Example 8 | 40 nm | 120% | 60% | 5 nm Carbon | 15% | PVDF | 900 | 412 | 46% | 39% |

In the case of using PVDF for the binder, Examples 12 to 20 have relatively high performance as compared with Comparative Examples 5 to 8, although the performance is degraded overall in terms of initial efficiency and capacity retention more than in the case of polyimide for the binder, and it has been thus demonstrated that the examples adequately achieve the advantageous effect of the invention in the present application.

Next, here are examples in the case of using polyamideimide (PAI) as a binder.

[Synthesis of Polyamideimide]

Under nitrogen atmosphere, 30.24 g (0.28 mol) of m-phenylenediamine, 84.1 g (0.42 mol) of 4,4'-diaminodiphenylether, and 610 g of N,N-dimethylacetoamide (DMAc) were added in a 2 L four-necked flask, and the diamines were dissolved at room temperature. Then, 147.4 g (0.70 mol) of trimellitic anhydride chloride was gradually added so as to keep the temperature of the polymerization reaction liquid from exceeding 30° C., after the completion of the addition, the temperature of the polymerization liquid was adjusted to 30° C., stirred for 1.0 hour, and thereby reacted to obtain a polymerization solution. The obtained polymerization solution was put into 1.7 liters of IW, and separated by filtration to obtain a powder of polyamide acid. The obtained powder of polyamide acid was dried at 150° C. for 5 hours, then at 200° C. for 2 hours, and then at 240° C. for 4 hours in a vacuum dryer at 30 torr in degree of vacuum to obtain a powder of polyamideimide resin.

After 15 g of the dried powder was dissolved with the addition of 85 g of NMP, the solution was filtrated through a 1 μm membrane filter to finally obtain a polyamideimide solution of 15% in solid content concentration.

[Preparation of Negative Electrode]

In an appropriate amount of NMP, 80 parts by weight of the obtained composite negative electrode material, 100 parts by weight of the polyamideimide precursor solution of 15% in solid content concentration, and 5 parts by weight of acetylene black as a conductive additives were dissolved and stirred to obtain a slurry paste. The obtained paste was applied onto electrolytic copper foil with the use of a doctor blade, dried at 110° C. for 30 minutes, and pressed by a roll-pressing machine to provide an electrode. Furthermore, the coated section of the electrode was subjected to punching into a circle of 16 mm in diameter, and to vacuum drying at 200° C. for 2 hours to prepare a negative electrode.

Examples 21 to 31

Except that the polyimide precursor solution was changed to a polyamideimide solution for the preparation of the paste, and that the vacuum drying was changed from 200° C. for 24 hours to 200° C. for 2 hour for the preparation of the negative electrode, the respective electrode characteristics were evaluated in the same way as in Examples 1 to 11. Table 3 shows the obtained initial charge capacity, initial discharge capacity, initial efficiency, and capacity retention.

TABLE 3

| | Material Composition of Composite Negative Electrode | | | | | | Negative Electrode Characteristics | | | |
|---|---|---|---|---|---|---|---|---|---|---|
| | Particle Size for Silicon Particles | Silicon Oxide Peak Area | Silicon Carbide Peak Area | Coating of Silicon Particle Surface | Silicon Ratio (mass %) | Binder | Initial Charge Capacity (mAh/g) | Initial Discharge Capacity (mAh/g) | Initial Efficiency | Capacity Maintenance Rate |
| Example 21 | 15 nm | 9% | 60% | 5 nm Carbon | 15% | Polyamideimide | 900 | 806 | 91% | 91% |
| Example 22 | 40 nm | 9% | 60% | 5 nm Carbon | 15% | Polyamideimide | 900 | 811 | 92% | 85% |
| Example 23 | 80 nm | 9% | 60% | 5 nm Carbon | 15% | Polyamideimide | 900 | 822 | 92% | 76% |
| Example 24 | 40 nm | 9% | 60% | 5 nm Carbon | 5% | Polyamideimide | 550 | 511 | 93% | 89% |
| Example 25 | 40 nm | 6% | 60% | 2 nm Carbon | 40% | Polyamideimide | 1740 | 1552 | 90% | 77% |
| Example 26 | 40 nm | 4% | 60% | 15 nm Carbon | 4% | Polyamideimide | 500 | 467 | 93% | 90% |
| Example 27 | 40 nm | 9% | 60% | 5 nm Carbon | 15% | Polyamideimide | 900 | 813 | 92% | 87% |
| Example 28 | 40 nm | 9% | 60% | 5 nm Carbon | 15% | Polyamideimide | 900 | 815 | 91% | 88% |
| Example 29 | 40 nm | 9% | 60% | 5 nm Carbon | 15% | Polyamideimide | 900 | 812 | 91% | 89% |
| Example 30 | 40 nm | 22% | 60% | 5 nm Carbon | 15% | Polyamideimide | 900 | 670 | 80% | 85% |
| Example 31 | 40 nm | 9% | 20% | 5 nm Carbon | 15% | Polyamideimide | 900 | 835 | 93% | 84% |

Examples 21 to 31 with the use of polyamideimide for the binder, Examples 1 to 11 with the use of the polyimide precursor solution, and Examples 12 to 20 with the use of polyvinylidene fluoride (PVdF) have been compared with each other to demonstrate that the battery with the use of polyamideimide for the binder exhibits characteristics comparable to those of the battery with the use of polyamideimide for the binder.

Example 32

[Preparation of Laminate-Type Lithium Secondary Battery]

[Preparation of Positive Electrode]

A lithium cobalt oxide represented by $LiCoO_2$ of 10 μm in average particle size, a carbon powder of 30 nm in average particle size, and an NMP solution of polyvinylidene fluoride were mixed, and further stirred with the addition of an appropriate amount of NMP to obtain a slurry paste. The lithium cobalt oxide, carbon powder, and polyvinylidene fluoride were 95:2.5:2.5 in ratio by weight. The obtained paste was applied onto aluminum foil of 15 μm in thickness with the use of a slit die coater, and dried at 110° C. for 30 minutes. Both sides of the aluminum foil were subjected to the application and drying of the electrode paste, and to pressing by a roll-pressing machine to provide an electrode.

[Preparation of Negative Electrode]

The composite negative electrode material prepared in Example 2 and the electrode paste were used for application onto electrolytic copper foil of 10 μm in thickness with the use of a slit die coater, dried at 110° C. for 30 minutes, and then further subjected to vacuum drying at 200° C. for 24 hours. Both sides of the electrolytic copper foil were subjected to the application and drying of the electrode paste, and to pressing by a roll-pressing machine to provide an electrode.

"Battery Preparation"

An aluminum plate (5 mm in width, 100 μm in thickness) and a nickel plate (5 mm in width, 100 μm in thickness) were connected as terminals respectively by electric resistance welding to the positive electrode and negative electrode prepared above. The positive electrode and the negative electrode were wound with a separator "CELGARD #2400" from CELGARD interposed therebetween, and placed in a rolled laminate exterior material of a film obtained by laminating polyethylene terephthalate exterior resin/aluminum foil/modified polypropylene thermally fused resin. As an electrolyte solution, 1 M $LiPF_6$ and 3 mass % of vinylene carbonate added to a mixed solvent of ethylene carbonate: diethyl carbonate=7:3 (volume ratio) were injected and subjected to sealing under reduced pressure to prepare a laminate-type lithium battery of 1500 mAh.

Comparative Example 9

Except that an electrode obtained by applying, drying, and pressing an electrode paste with spherical graphite of 10 μm in average particle size on both sides of electrolytic copper foil was used in place of the composite negative electrode material prepared in Example 2, a laminate-type lithium secondary battery was prepared in the same way as in Example 32.

The external dimensions of the laminate-type battery according to Example 32 with the use of the composite negative electrode material prepared in Example 2 were measured to calculate the energy density per volume, which was 440 Wh/L. On the other hand, the external dimensions of the laminate-type battery with the use of the spherical graphite according to Comparative Example 9 were measured to calculate the energy density per volume, which was 350 Wh/L. As just described, the use of the composite negative electrode material containing substantially no silicon oxide in the coating layer, with the core particle surfaces of silicon coated with the coating layer of carbon, has succeeded in obtaining a lithium secondary battery that is high in energy density.

The invention claimed is:

1. A negative electrode material for a lithium ion secondary battery, comprising: core particles of silicon; and a coating layer of carbon coating surfaces of each of the core particles of the silicon, wherein the core particles of the silicon are 5 nm or more and 100 nm or less in average particle size, and a peak area for silicon oxide near 104 eV is smaller than 10% of the sum of peak areas for silicon and silicon-carbon near 100 eV in electron spectroscopy for chemical analysis of the negative electrode material, wherein the coating layer of carbon is 1 nm or more and 20 nm or less in thickness.

2. The negative electrode material for a lithium ion secondary battery according to claim 1, wherein a peak area for silicon carbide near 100.9 eV is smaller than 100%of a peak area for silicon near 99.6 eV in electron spectroscopy for chemical analysis.

3. A composite negative electrode material for a lithium ion secondary battery, comprising: the negative electrode material for a lithium ion secondary battery according to claim 1; and a matrix material, wherein a silicon content is 3 mass % to 50 mass %.

4. The composite negative electrode material for a lithium ion secondary battery according to claim 3, wherein the matrix material at least partially comprises a material capable of storing and releasing lithium ions.

5. The composite negative electrode material for a lithium ion secondary battery according to claim 4, wherein the substance capable of storing and releasing lithium ions at least partially comprises a graphite selected from natural graphite, artificial graphite, and graphene.

6. The composite negative electrode material for a lithium ion secondary battery according to claim 3, wherein the matrix material at least partially comprises graphite having a thickness of 20 nm or less.

7. The composite negative electrode material for a lithium ion secondary battery according to claim 3, wherein the composite negative electrode material is 0.5 μm to 20 μm in average particle size.

8. A resin composition for a lithium ion secondary battery negative electrode, the resin composition containing at least the negative electrode material for a lithium ion secondary battery according to claim 1, as well as a binder resin and a solvent.

9. The resin composition for a lithium ion secondary battery negative electrode according to claim 8, wherein the binder resin is a polyimide resin or a precursor thereof, or a polyamideimide resin.

10. A negative electrode for a lithium ion secondary battery, the negative electrode obtained by binding the resin composition for a lithium ion secondary battery negative electrode according to claim 8 to a current collector.

11. A lithium ion secondary battery using the negative electrode for a lithium ion secondary battery according to claim 10.

* * * * *